US012795051B2

(12) United States Patent
Jung et al.

(10) Patent No.: US 12,795,051 B2
(45) Date of Patent: Nov. 10, 2026

(54) ADJUSTMENT OF SHUTTER VALUE OF SURVEILLANCE CAMERA VIA AI-BASED OBJECT RECOGNITION

(71) Applicant: Hanwha Vision Co., Ltd., Seongnam-si (KR)

(72) Inventors: Youngje Jung, Seongnam-si (KR); Sangwook Lee, Seongnam-si (KR); Jeongeun Lim, Seongnam-si (KR); Jaewoon Byun, Seongnam-si (KR); Eunjeong Kim, Seongnam-si (KR); Kibum Park, Seongnam-si (KR); Sangwon Lee, Seongnam-si (KR); Eunji Choi, Seongnam-si (KR); Seungin Noh, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 278 days.

(21) Appl. No.: 18/381,964

(22) Filed: Oct. 19, 2023

(65) Prior Publication Data

US 2024/0048672 A1 Feb. 8, 2024

Related U.S. Application Data

(63) Continuation of application No. PCT/KR2021/010626, filed on Aug. 11, 2021.

(30) Foreign Application Priority Data

Apr. 19, 2021 (KR) ........................ 10-2021-0050534

(51) Int. Cl.

*H04N 7/18* (2006.01)
*G06T 7/20* (2017.01)
(Continued)

(52) U.S. Cl.

CPC ............... *H04N 7/183* (2013.01); *G06T 7/20* (2013.01); *G06V 10/10* (2022.01); *G06V 10/82* (2022.01);
(Continued)

(58) Field of Classification Search

CPC ........ H04N 7/183; H04N 23/61; H04N 23/73; H04N 23/64; H04N 23/81; G06V 20/52;
(Continued)

(56) References Cited

U.S. PATENT DOCUMENTS

RE42,978 E * 11/2011 Haneda .................. H04N 19/20 375/240.26
9,571,741 B1 2/2017 Ramsay
(Continued)

FOREIGN PATENT DOCUMENTS

CN 101068313 A 11/2007
CN 107181917 A 9/2017
(Continued)

OTHER PUBLICATIONS

Communication dated Mar. 31, 2025, issued by the Swedish Intellectual Property Office in Swedish Application No. 2351197-5.
(Continued)

*Primary Examiner* — Trang U Tran
(74) *Attorney, Agent, or Firm* — Sughrue Mion, PLLC

(57) ABSTRACT

A processing apparatus for a camera image is disclosed. The processing apparatus for the camera image is configured to: recognize an object in an image obtained via an image capture device; calculate a target shutter value corresponding to the movement speed of the object; and determine, on the basis of the target shutter value, a shutter value at a start point of a sensor gain control duration in an automatic exposure control step. If the movement of an object is fast, a high-speed shutter is applied, and, if an object is not
(Continued)

present or the movement of an object is slow, a low-speed shutter is applied. Accordingly, noise and motion blur may be minimized according to the level of illuminance in the automatic exposure control step.

16 Claims, 15 Drawing Sheets

(51) Int. Cl.

| | |
|---|---|
| ***G06V 10/10*** | (2022.01) |
| ***G06V 10/82*** | (2022.01) |
| ***G06V 20/52*** | (2022.01) |
| ***H04N 23/60*** | (2023.01) |
| ***H04N 23/61*** | (2023.01) |
| ***H04N 23/73*** | (2023.01) |
| ***H04N 23/81*** | (2023.01) |

(52) U.S. Cl.
CPC ............. *G06V 20/52* (2022.01); *H04N 23/61* (2023.01); *H04N 23/64* (2023.01); *H04N 23/73* (2023.01); *H04N 23/81* (2023.01); *G06T 2207/20081* (2013.01); *G06T 2207/30232* (2013.01)

(58) Field of Classification Search
CPC .......... G06V 10/10; G06V 10/82; G06T 7/20; G06T 2207/20081; G06T 2207/30232
USPC .......................................................... 348/143
See application file for complete search history.

(56) References Cited

U.S. PATENT DOCUMENTS

| | | | | |
|---|---|---|---|---|
| 11,298,017 B2 * | 4/2022 | Tran | A61B 3/107 | |
| 11,736,807 B2 * | 8/2023 | Tsai | H04N 23/73 | 348/148 |
| 2008/0165264 A1 | 7/2008 | Saito et al. | | |
| 2015/0002732 A1 | 1/2015 | Hjelmstrom | | |
| 2017/0212408 A1 | 7/2017 | Ma et al. | | |
| 2019/0037118 A1 | 1/2019 | Oh | | |
| 2019/0124264 A1 | 4/2019 | Kogure | | |
| 2020/0280666 A1 | 9/2020 | Oh | | |
| 2022/0053115 A1 | 2/2022 | Oh | | |

FOREIGN PATENT DOCUMENTS

| | | | | | |
|---|---|---|---|---|---|
| CN | 105959587 | B | | 2/2019 | |
| EP | 3611656 | A1 | | 2/2020 | |
| JP | 2006-135838 | A | | 5/2006 | |
| JP | 2008-60981 | A | | 3/2008 | |
| JP | 2010-250710 | A | | 11/2010 | |
| JP | 2016-92513 | A | | 5/2016 | |
| KR | 101870641 | B1 | * | 6/2018 | G03B 9/58 |
| KR | 10-2019-0013080 | B1 | | 2/2019 | |
| KR | 102201096 | B1 | * | 1/2021 | G06T 7/248 |
| WO | 2021/051304 | A1 | | 3/2021 | |

OTHER PUBLICATIONS

International Search Report (PCT/ISA/210) dated Jan. 14, 2022, issued by International Searching Authority for International Application No. PCT/KR2021/010626.
Written Opinion (PCT/ISA/237) dated Jan. 14, 2022, issued by International Searching Authority for International Application No. PCT/KR2021/010626.
Office Action issued May 30, 2025 by the Korean Patent Office for KR Patent Application No. 10-2023-7035637.
Communication dated May 27, 2024, issued by the Swedish Patent and Registration Office in Swedish Application No. 2351197-5.
Communication issued on Apr. 17, 2026 by the China National Intellectual Property Administration in Chinese Patent Application No. 202180097267.5.
Communication issued on Feb. 9, 2026 by the Swedish Intellectual Property Office in Swedish Patent Application No. 2351197-5.

* cited by examiner

ADJUSTMENT OF SHUTTER VALUE OF SURVEILLANCE CAMERA VIA AI-BASED OBJECT RECOGNITION

CROSS REFERENCE TO RELATED APPLICATION

This application is a continuation application of International Application No. PCT/KR2021/010626 filed on Aug. 11, 2021, which is based on and claims priority from Republic of Korea Patent Application No. 10-2021-0050534, filed on Apr. 19, 2021, which is incorporated herein in its entirety by reference.

BACKGROUND

1. Field

The present disclosure relates to a processing method of a surveillance camera image.

2. Description of Related Art

A high-speed shutter used to reduce an afterimage in a surveillance camera inevitably has a large amount of sensor gain amplification even in low-illumination conditions, resulting in a lot of noise on a screen of an image obtained by the surveillance cameras.

In order to reduce the occurrence of such noise, a method of using a low-speed shutter may be considered. In the case of using the low-speed shutter is used, noise on the screen may decrease, but motion blur may increase in people and objects (for example, vehicles, etc.), which are the main targets of surveillance cameras. Image data in which such motion blur increases may have a problem in that people and objects cannot be recognized.

In addition, surveillance cameras need to appropriately lower noise removal intensity in order to minimize a movement afterimage of a surveillance target object. However, if the noise removal intensity is lowered, the movement afterimage may decrease but noise may increase, and noise on the screen may always occur excessively, causing problems of increasing an image transmission band width.

Therefore, a method of minimizing the afterimage effect while increasing a recognition rate for people and objects that are the main surveillance targets is required.

SUMMARY

The present disclosure provides a processing method of a surveillance camera image capable of minimizing motion blur by automatically controlling a shutter speed depending on the presence or absence of objects on a screen.

The present disclosure also provides a processing method of a surveillance camera image capable of minimizing motion afterimages and noise depending on whether objects on a screen move in low-illumination conditions.

The technical problems to be addressed by the present disclosure are not limited to the technical problems mentioned above, and other technical problems not mentioned may be clear to those skilled in the art from the detailed description of the invention below.

In an aspect, a processing apparatus for a surveillance camera image may include: an image capture device; and a processor configured to recognize an object in an image acquired through the image capture device, calculate a target shutter value corresponding to a movement speed of the object, and determine a shutter value at a starting point of a sensor gain control section in an automatic exposure control process based on the calculated target shutter value, wherein the shutter value at the starting point of the sensor gain control section is determined to vary between a first shutter value and a second shutter value smaller than the first shutter value depending on the movement speed of the object.

The processor may set the shutter value to a high-speed shutter value when the movement speed of the object is greater than or equal to a first threshold speed, and set the shutter value to a low-speed shutter value when the movement speed of the object is less than a second threshold speed less than the first threshold speed.

The processor may recognize the object by applying a deep learning-based YOLO (You Only Look Once) algorithm.

The processor may assign an identifier (ID) to each recognized object, extracts coordinates of the object, and calculate an average movement speed of the object based on coordinate information about the object included in a first image frame and a second image frame with a priority lower than the first image frame.

The target shutter value may be calculated based on an amount of movement of the object during one frame time with respect to a minimum shutter speed of the surveillance camera and resolution of the surveillance camera image.

The amount of movement during one frame may be calculated based on the average movement speed of the object.

The resolution of the surveillance camera image may refer to visual sensitivity applicable to each of a high-resolution camera and/or a low-resolution camera.

The processor may train a learning model by setting performance information corresponding to the resolution of the surveillance camera image and speed information about an object recognizable without motion blur as learning data, and calculate the target shutter value based on the learning model that uses the movement speed of the object as input data and automatically calculates the target shutter value according to the movement speed of the object.

The processor may control the shutter value at the starting point of the sensor gain control section to vary in a section between the low-speed shutter value and the high-speed shutter value depending on the movement speed of the object.

The shutter value at the starting point of the sensor gain control section may be determined to converge on the first shutter value as the movement speed of the object is faster, and determined to converge on the second shutter value as the movement speed of the object is slower.

The first shutter value may be 1/300 second or more, and the second shutter value may be 1/30 second.

In the automatic exposure control process, the shutter speed may be controlled in a low-illumination section corresponding to the sensor gain control section and a high-illumination section using an iris and a shutter, the target shutter value may be controlled according to an automatic exposure control schedule that is inversely proportional as a sensor gain amplification amount increases by passing through the shutter value at the starting point of the sensor gain control section, and the automatic exposure control schedule may be set such that the shutter value at the starting point of the sensor gain control section increases when the movement speed of the object increases.

Accordingly, the shutter value may be increased to be applied according to the movement speed of the object not only in the low-illumination section but also in the high-illumination section.

The processing apparatus may further include: a communication unit, wherein the processor may transmit image data acquired through the image capture device to an external server through the communication unit, and receive artificial intelligence-based object recognition results from the external server through the communication unit.

In another aspect, an image processing apparatus for a surveillance camera includes: an image capture device; and a processor configured to recognize an object in an image acquired by the image capture device, calculates a movement speed of the recognized object, and variably control a shutter value according to the movement speed of the object, wherein the processor sets the image acquired from the image capture device as input data, sets object recognition as output data, and applies a previously trained neural network model to recognize the object.

When no object exists, the processor may apply a first shutter value corresponding to a minimum shutter value (or a minimum shutter speed), and when at least one object is recognized and an average movement speed of the object exceeds a predetermined threshold, the processor may apply a second shutter value corresponding to a maximum shutter value.

The processor may variably apply a shutter value in a section between the first shutter value and the second shutter value according to an average movement speed of the object.

In another aspect, a surveillance camera system includes: a surveillance camera configured to capture an image of a surveillance region; and a computing device configured to receive the image captured by the surveillance camera through a communication unit, recognize an object in the image through an artificial intelligence-based object recognition algorithm, calculate a shutter value corresponding to a movement speed of the recognized object, and transmit the calculated shutter value to the surveillance camera, wherein the shutter value varies in a section between a first shutter value and a second shutter value corresponding to a minimum shutter value (or a minimum shutter speed) according to an average movement speed of the object.

In another aspect, a processing method of a surveillance camera image includes: recognizing an object in an image obtained through an image capture device; calculating a target shutter value corresponding to a movement speed of the recognized object; and determining a shutter value at a starting point of a sensor gain control section in an automatic exposure control process based on the calculated target shutter value, wherein the shutter value at the starting point of the sensor gain control section is determined to vary between a first shutter value and a second shutter value smaller than the first shutter value depending on the movement speed of the object.

In the recognizing of the object, the object may be recognized by applying a deep learning-based YOLO algorithm.

The processing method may further include: assigning an ID to each recognized object and extracting coordinates of the object; and calculating an average movement speed of the object based on the coordinate information about the object included in a first image frame and a second image frame with priority lower than the first image frame.

The target shutter value may be calculated based on an amount of movement of the object during one frame time with respect to a minimum shutter speed (or a minimum shutter speed) of the surveillance camera and resolution of the surveillance camera image.

The calculating of the target shutter value may include: training a learning model by setting performance information corresponding to the resolution of the surveillance camera image and speed information about an object recognizable without motion blur as learning data, and calculating the target shutter value based on the learning model that uses the movement speed of the object as input data and automatically calculates the target shutter value according to the movement speed of the object.

The shutter value at the starting point of the sensor gain control section may be determined to converge on the first shutter value as the movement speed of the object is faster, and determined to converge on the second shutter value as the movement speed of the object is slower.

The first shutter value may be 1/300 second or more, and the second shutter value may be 1/30 second.

In another aspect, a processing method of a surveillance camera image includes: recognizing an object in an image obtained through an image capture device; calculating a target shutter value corresponding to a movement speed of the recognized object; and determining a shutter value at a starting point of a sensor gain control section in an automatic exposure control process based on the calculated target shutter value, wherein the shutter value is set to a high-speed shutter value when the movement speed of the object is greater than or equal to a first threshold speed, and set to a low-speed shutter value when the movement speed of the object is less than a second threshold speed smaller than the first threshold speed.

In another aspect, a processing method of a surveillance camera image includes: recognizing an object in an image obtained through an image capture device; calculating a movement speed of the recognized object; and variably controlling the shutter value according to the movement speed of the object; wherein, in the recognizing of the object, the image acquired by the image capture device as input data and object recognition is set as output data, and the object is recognized by applying a previously trained neural network model.

The image processing method of a surveillance camera according to an embodiment of the present disclosure may minimize motion afterimages, while maintaining image clarity, by appropriately controlling a shutter speed depending on the presence or absence of objects on the screen.

In addition, the image processing method of a surveillance camera according to an embodiment of the present disclosure may solve the problems of increased noise and transmission bandwidth that occur when a high-speed shutter is maintained in low-illumination conditions in terms of the characteristics of surveillance cameras, which needs to maintain a high-speed shutter at all times.

The effects that may be obtained from the present disclosure are not limited to the effects mentioned above, and other effects not mentioned may be clearly understood by those skilled in the art from the description below.

BRIEF DESCRIPTION OF DRAWINGS

The accompanying drawings, which are included as part of the detailed description to help understanding of the present disclosure, provide embodiments of the present disclosure and, along with the detailed description, and describe technical features of the present disclosure.

Figure 1:
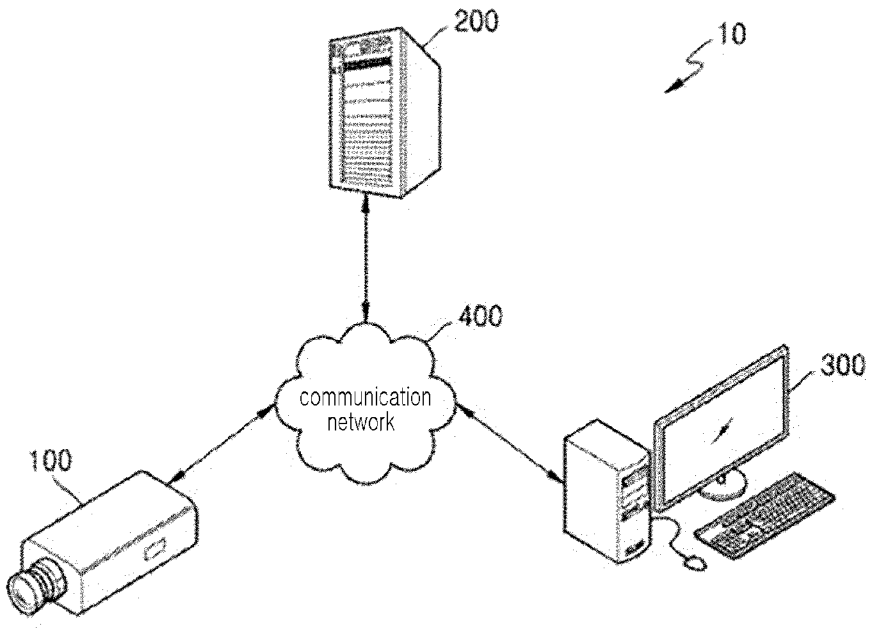
FIG. 1 is a diagram illustrating a surveillance camera system for implementing a processing method of a surveillance camera image according to an embodiment of the present disclosure.

The accompanying drawings, which are included as part of the detailed description to help understanding of the present disclosure, provide embodiments of the present disclosure and describe technical features of the present disclosure along with the detailed description.

DETAILED DESCRIPTIONS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components should not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

Automatic exposure (AE) control technology is a technology that maintains image brightness of cameras constant, and refers to a technology of controlling brightness using a shutter speed/iris in the case of high brightness (bright outdoor illumination) and correcting brightness of images by amplifying a gain of an image sensor in low illumination (dark illumination) conditions.

Also, the shutter speed refers to a time for a camera to be exposed to light. When the shutter speed is low (1/30 sec), an exposure time is long and an image is brighter, but there is a problem in that motion blur occurs because the movement of objects accumulates during the exposure time. Conversely, when the shutter speed is high (1/200 sec or more), the camera exposure time is short and an image may be dark, but the accumulation of the movement of objects is also shortened, which reduces motion blur.

Since surveillance cameras should monitor people and objects, which are the main surveillance targets, without motion blur, it is advantageous to maintain a high-speed shutter. However, when the shutter speed is high, images becomes dark due to a short exposure time, and in low illumination, a gain amplification of the image sensor should be increased to correct the brightness, which may cause relatively more noise. In general, as the gain amplification of an image sensor increases, noise on the screen also increases. Ultimately, using a high shutter speed in low-illumination conditions may reduce motion blur, but may cause increased noise on the screen.

Meanwhile, in a surveillance region imaged by actual surveillance cameras, there are not always objects to be monitored, but it is necessary to be able to monitor randomly occurring objects at any time without motion blur, and thus, a high-speed shutter needs to be inevitably maintained. Maintaining the high-speed shutter causes a lot of noise in low-illumination conditions, so it may also cause many side effects due to noise. For example, as noise increases, the amount of compressed and transmitted image data may increase to increase an image transmission bandwidth and the outline of objects may be blurred due to noise.

In a processing method of a surveillance camera image according to an embodiment of the present disclosure, a shutter speed needs to be automatically controlled depending on the presence or absence of an object on the screen to meet the purpose of the surveillance camera. However, in the related art, motion information was widely used to determine whether an object exists, but there was a problem in that a false alarm frequently occurred due to the natural environment (wind, shaking leaves, etc.). Accordingly, in the present disclosure, objects are recognized through artificial intelligence (AI) image analysis, an identifier (ID) is assigned to each object, and an average movement speed for the objects to which IDs have been assigned is calculated. The calculated average movement speed of the objects may be used to calculate an appropriate shutter speed that does not cause motion blur.

Meanwhile, in general, under high brightness (outdoor or bright illumination conditions) conditions, motion blur of objects rarely occurs because brightness is corrected using a high-speed shutter. Therefore, the processing method of a surveillance camera image according to an embodiment of the present disclosure may be applied to control a shutter under low illumination conditions in which an image sensor gain is inevitably amplified due to the use of a high speed shutter, and thus, noise increases as the image sensor gain is amplified.

FIG. 1 is a diagram illustrating a surveillance camera system for implementing a processing method of a surveillance camera image according to an embodiment of the present disclosure.

Referring to FIG. 1, an image management system 10 according to an embodiment of the present disclosure may include an image capture device 100 and an image management server 200. The image capture device 100 may be an electronic imaging device disposed at a fixed location in a specific place, may be an electronic imaging device that may be moved automatically or manually along a predetermined path, or may be an electronic imaging device that may be moved by a person or a robot. The image capture device 100 may be an IP (Internet protocol) camera connected to the wired/wireless Internet and used. The image capture device 100 may be a PTZ (pan-tilt-zoom) camera having pan, tilt, and zoom functions. The image capture device 100 may have a function of recording a monitored area or taking a picture. The image capture device 100 may have a function of recording a sound generated in a monitored area. When a change, such as movement or sound, occurs in the monitored area, the image capture device 100 may have a function of generating a notification or recording or photographing. The image capture device 100 may receive and store a trained object recognition learning model from the image management server 200. Accordingly, the image capture device 100 may perform an object recognition operation using the trained object recognition learning model.

The image management server 200 may be a device that receives and stores an image as it is captured by the image capture device 100 and/or an image obtained by editing the image. The image management server 200 may analyze the received image to correspond to the purpose. For example, the image management server 200 may detect an object in the image using an object detection algorithm. An AI-based algorithm may be applied to the object detection algorithm, and an object may be detected by applying a pre-trained artificial neural network model.

Meanwhile, the image management server 200 may store various learning models suitable for the purpose of image analysis. In addition to the aforementioned learning model for object detection, a model capable of acquiring object characteristic information that allows the detected object to be utilized may be stored. The image management server 200 may perform an operation of training the learning model for object recognition described above.

In addition, the image management server 200 may analyze the received image to generate metadata and index information for the corresponding metadata. The image management server 200 may analyze image information and/or sound information included in the received image together or separately to generate metadata and index information for the metadata.

The image management system 10 may further include an external device 300 capable of performing wired/wireless communication with the image capture device 100 and/or the image management server 200.

The external device 300 may transmit an information provision request signal for requesting to provide all or part of an image to the image management server 200. The external device 300 may transmit an information provision request signal to the image management server 200 to request whether or not an object exists as the image analysis result. In addition, the external device 300 may transmit, to the image management server 200, metadata obtained by analyzing an image and/or an information provision request signal for requesting index information for the metadata.

The image management system 10 may further include a communication network 400 that is a wired/wireless communication path between the image capture device 100, the image management server 200, and/or the external device 300. The communication network 400 may include, for example, a wired network, such as LANs (Local Area Networks), WANs (Wide Area Networks), MANs (Metropolitan Area Networks), ISDNs (Integrated Service Digital Networks), and a wireless network, such as wireless LANs, CDMA, Bluetooth, and satellite communication, but the scope of the present disclosure is not limited thereto.

Figure 2:
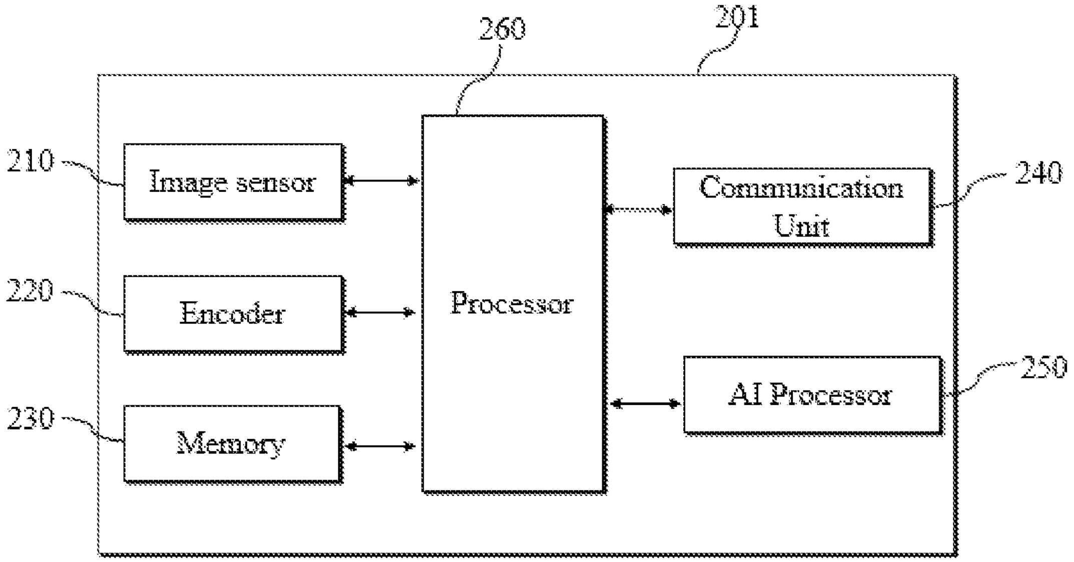
FIG. 2 is a schematic block diagram of a surveillance camera according to an embodiment of the present disclosure.

FIG. 2 is a block diagram illustrating a configuration of the surveillance camera shown in FIG. 1.

Referring to FIG. 2, as an example, a camera 201 is a network camera that performs an intelligent image analysis function and generates a signal of the image analysis, but the operation of the network surveillance camera system according to an embodiment of the present disclosure is not limited thereto. The camera 201 may be or correspond to the image capture device 100 shown in FIG. 1, and may be implemented as a surveillance camera. However, the camera 201 may also be implemented as a general camera or a camera unit included in other types of computing device such as a smartphone, laptop computer, a tablet computer, etc.

The camera 201 includes an image sensor 210, an encoder 220, a memory 230, a communication interface 240, an AI processor 250, a processor 260.

The image sensor 210 performs a function of acquiring an image by photographing a surveillance region, and may be implemented with, for example, a CCD (Charge-Coupled Device) sensor, a CMOS (Complementary Metal-Oxide-Semiconductor) sensor, and the like.

The encoder 220 performs an operation of encoding the image acquired through the image sensor 210 into a digital signal, based on, for example, H.264, H.265, MPEG (Moving Picture Experts Group), M-JPEG (Motion Joint Photographic Experts Group) standards or the like.

The memory 230 may store image data, audio data, still images, metadata, and the like. As mentioned above, the metadata may be text-based data including object detection information (movement, sound, intrusion into a designated area, etc.) and object identification information (person, car, face, hat, clothes, etc.) photographed in the surveillance region, and a detected location information (coordinates, size, etc.).

In addition, the still image is generated together with the text-based metadata and stored in the memory 230, and may be generated by capturing image information for a specific analysis region among the image analysis information. For example, the still image may be implemented as a JPEG image file.

For example, the still image may be generated by cropping a specific region of the image data determined to be an identifiable object among the image data of the surveillance region detected for a specific region and a specific period, and may be transmitted in real time together with the text-based metadata.

The communication unit 240 transmits the image data, audio data, still image, and/or metadata to an image receiving/searching device, which may be or correspond to the external device 300 of FIG. 1. The communication unit 240 according to an embodiment may transmit image data, audio data, still images, and/or metadata to the image receiving/searching device in real time. The communication unit 240 may perform at least one communication function among wired and wireless LAN (Local Area Network), Wi-Fi, ZigBee, Bluetooth, and Near Field Communication. The communication unit 240 may include any one or any combination of a digital modem, a radio frequency (RF) modem, an antenna circuit, a WiFi chip, and related software and/or firmware.

The AI processor 250 is designed for an artificial intelligence image processing and applies a deep learning based object detection algorithm which is learned in the image acquired through the surveillance camera system according to an embodiment of the present disclosure. The AI processor 250 may be implemented as an integral module with the processor 260 that controls the overall system or an independent module. The embodiments of the present disclosure may apply a YOLO (You Only Lock Once) algorithm in object detection. YOLO is an AI algorithm suitable for surveillance cameras that process real-time video due to a fast object detection speed thereof. Unlike other object-based algorithms (faster R-CNN, R FCN, FPN-FRCN, etc.), the YOLO algorithm, after resizing one input image, outputs a bounding box indicating a location of each object and a classification probability of what is an object as a result of passing through a single neural network only once. Finally, one object is detected once through non-max suppression.

Meanwhile, it should be noted that the object recognition algorithm disclosed in the present disclosure is not limited to the aforementioned YOLO and may be implemented with various deep learning algorithms.

Meanwhile, a learning model for object recognition applied to the present disclosure may be a model trained by defining camera performance, movement speed information about objects that may be recognized without motion blur in a surveillance camera, etc. as learning data. Accordingly, the trained model may have input data which is a movement speed of an object and a shutter speed optimized for the movement speed of the object as output data.

Figure 3:
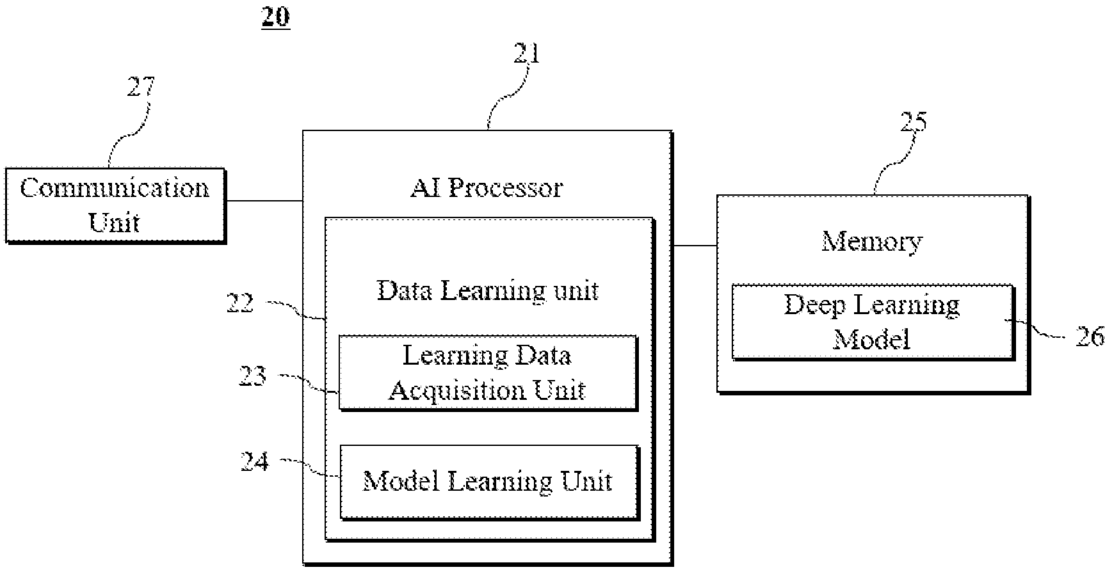
FIG. 3 is a diagram illustrating an AI device (module) applied to analysis of surveillance camera images according to an embodiment of the present disclosure.

FIG. 3 is a diagram illustrating an AI (artificial intelligence) device (module) applied to training of the object recognition model according to an embodiment of the present disclosure.

Referring to FIG. 3, an AI device 20 may include an electronic device including an AI module capable of performing AI processing, or a server including an AI module. In addition, the AI device 20 may be included in the image capture device 100 or the image management server 200 as at least a part thereof to perform at least a part of AI processing together.

The AI processing may include all operations related to a controller of the image capture device 100 or the image management server 200. For example, the image capture device 100 or the image management server 200 may AI-process the obtained image signal to perform processing/determination and control signal generation operations.

The AI device 20 may be a client device that directly uses the AI processing result or a device in a cloud environment that provides the AI processing result to other devices. The AI device 20 may be a computing device capable of learning a neural network, and may be implemented in various electronic devices, such as a server, a desktop PC, a notebook PC, and a tablet PC.

The AI device 20 may include an AI processor 21, a memory 25, and/or a communication unit 27.

Here, the neural network for recognizing data related to image capture device 100 may be designed to simulate the brain structure of human on a computer and may include a plurality of network nodes having weights and simulating the neurons of human neural network. The plurality of network nodes may transmit and receive data in accordance with each connection relationship to simulate the synaptic activity of neurons in which neurons transmit and receive signals through synapses. Here, the neural network may include a deep learning model developed from a neural network model which may be an artificial neural network (ANN) model. In the deep learning model, a plurality of network nodes is positioned in different layers and may transmit and receive data in accordance with a convolution connection relationship. The neural network, for example, includes various deep learning techniques, such as deep neural networks (DNN), convolutional deep neural networks (CNN), recurrent neural networks (RNN), a restricted boltzmann machine (RBM), deep belief networks (DBN), and a deep Q-network, and may be applied to fields, such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 may store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. Of data by the AI processor 21 may be performed. Further, the memory 25 may store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 may learn references about what learning data are used and how to classify and recognize data using the learning data in order to determine data classification/recognition. The data learning unit 22 may learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that may be read through a computer. In this case, at least one software module may be provided by an OS (operating system) or may be provided by an application.

The data learning unit 22 may include a learning data acquiring unit 23 and a model learning unit 24.

The learning data acquisition unit 23 may acquire learning data required for a neural network model for classifying and recognizing data.

The model learning unit 24 may perform learning such that a neural network model has a determination reference about how to classify predetermined data, using the acquired learning data. In this case, the model learning unit 24 may train a neural network model through supervised learning that uses at least some of learning data as a determination reference. Alternatively, the model learning data 24 may train a neural network model through unsupervised learning that finds out a determination reference by performing learning by itself using learning data without supervision. Further, the model learning unit 24 may train a neural network model through reinforcement learning using feedback about whether the result of situation determination according to learning is correct. Further, the model learning unit 24 may train a neural network model using a learning algorithm including error back-propagation or gradient decent.

When the neural network model is trained, the model training unit 24 may store the trained neural network model in a memory. The model training unit 24 may store the trained neural network model in the memory of the server connected to the AI device 20 through a wired or wireless network.

The data learning unit 22 may further include a learning data preprocessor (not shown) and a learning data selector (not shown) to improve the analysis result of a recognition model or reduce resources or time for generating a recognition model.

The learning data preprocessor may preprocess acquired data such that the acquired data may be used in learning for situation determination. For example, the learning data preprocessor may process acquired data in a predetermined format such that the model learning unit 24 may use learning data acquired for learning for image recognition.

Further, the learning data selector may select data for learning from the learning data acquired by the learning data acquiring unit 23 or the learning data preprocessed by the preprocessor. The selected learning data may be provided to the model learning unit 24. For example, the learning data selector may select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it may make the model learning unit 24 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator may estimate that a predetermined reference is not satisfied.

The communication unit 27 may transmit the AI processing result of the AI processor 21 to an external electronic device. For example, the external electronic device may include a surveillance camera, a Bluetooth device, an autonomous vehicle, a robot, a drone, an AR (augmented reality) device, a mobile device, a home appliance, and the like. The communication unit 27 may include any one or any combination of a digital modem, a radio frequency (RF) modem, an antenna circuit, a WiFi chip, and related software and/or firmware.

Meanwhile, the AI device 20 shown in FIG. 3 has been functionally divided into the AI processor 21, the memory 25, the communication unit 27, and the like, but the aforementioned components are integrated as one module and it may also be called an AI module.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 4:
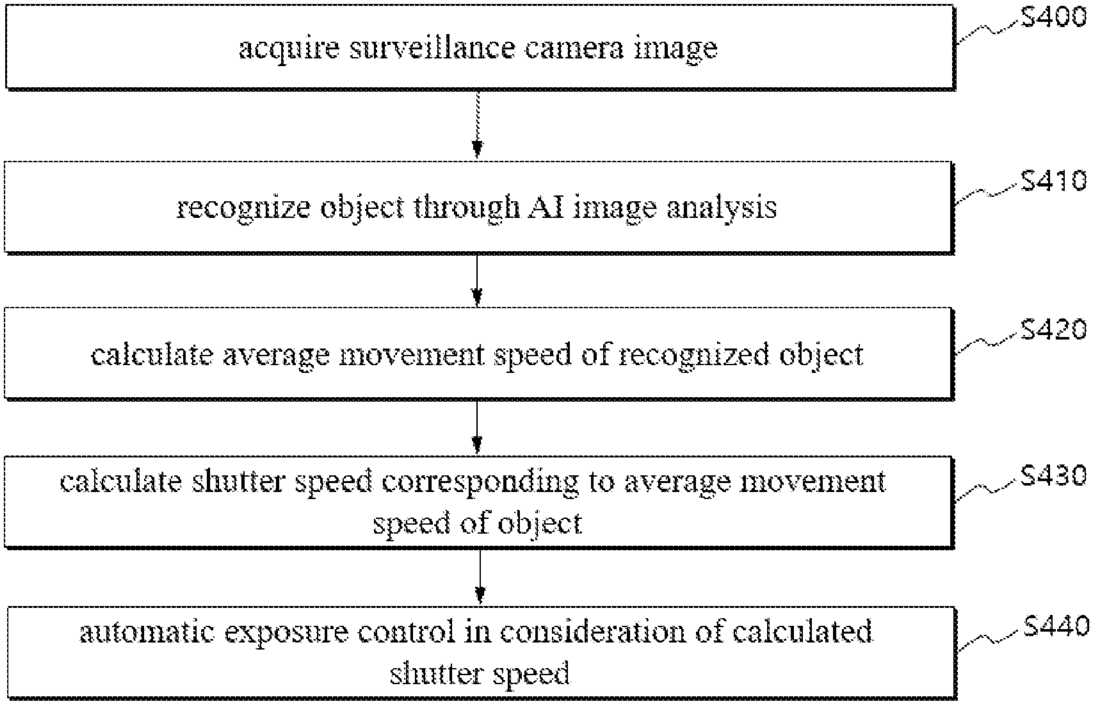
FIG. 4 is a flowchart of a processing method of a surveillance camera image according to an embodiment of the present disclosure.

FIG. 4 is a flowchart of a processing method of a surveillance camera image according to an embodiment of the present disclosure. The image processing method shown in FIG. 4 may be implemented through the surveillance camera system, the surveillance camera device, and the processor or controller included in the surveillance camera device described above with reference to FIGS. 1 to 3. For convenience of description, the image processing method is described on the premise that various functions may be controlled through the processor 260 of the camera 201 shown in FIG. 2, but the present disclosure is not limited thereto.

Referring to FIG. 4, the processor 260 acquires a surveillance camera image (S400). The surveillance camera image may include a video.

The processor 260 may control the acquired image to perform an object recognition operation through an AI image analysis system (S410).

The AI image analysis system may be an image processing module included in a surveillance camera. In this case, the AI processor included in the image processing module may determine recognize an object in an image by applying a predefined object recognition algorithm to an input image (video), thereby determining whether an object exists. In addition, the AI video analysis system may be an image processing module provided on an external server communicatively connected to the surveillance camera. In this case, the processor 260 of the surveillance camera may request object recognition request command and/or a movement degree (a movement speed of the object, an average movement speed information about the object, etc.), while transmitting the input image to the external server through the communication unit.

The processor 260 may calculate an average movement speed of the recognized object (S420). The process of calculating the average movement speed of the recognized object will be described in detail with reference to FIGS. 7 and 8.

The processor 260 may calculate a shutter speed corresponding to the calculated average movement speed of the object (S430). Since an afterimage effect becomes severe as the movement speed of the object increases, there is no choice but to increase the shutter speed. Here, the process of calculating an optimal shutter speed value to minimize the degree of increasing the shutter speed or minimizing the afterimage effect in a specific movement speed of the object will be described in detail with reference to FIG. 9.

The processor 260 may perform automatic exposure (AE) control by considering the calculated shutter speed value (S440).

The image processing method according to an embodiment of the present disclosure may be advantageously applied in a relatively low-illumination environment. Especially, in a high-illumination environment, high-speed shutters are usually used, so afterimage effects due to object movement may not be a major problem. However, in a low-illumination environment, automatic exposure control may be achieved through sensor gain control in a section that is more sensitive to sensor gain than exposure time. Accordingly, in low-illumination environments, noise due to sensor gain control may be problematic. To reduce this noise, maximum brightness should be secured, and ultimately, maintaining a low-speed shutter may be advantageous. However, unlike general cameras, in the case of surveillance cameras, due to the need to clearly recognize objects moving at a high speed even in low-illumination environments, maintaining a high-speed shutter to eliminate the afterimage effect of objects as much as possible may be inevitably considered a priority. Therefore, for surveillance cameras in low-illumination environments, it is most important to determine an optimal shutter value according to brightness and the degree of object movement.

Hereinabove, through the embodiments of the present disclosure, the order in which the object in an image of a surveillance camera is recognized, the optimal shutter value is calculated based on whether the recognized object moves, the degree of movement of the object (the average movement speed of the object), and the object speed, and through this, automatic exposure control is performed has been described.

Hereinbelow, an object recognition, calculation of an average movement speed of an object, calculation of a shutter speed according to an average movement speed of the object, and adjustment of a shutter value according to the movement speed of the object at a starting point of a low-illumination section will be described in detail.

Figure 5:
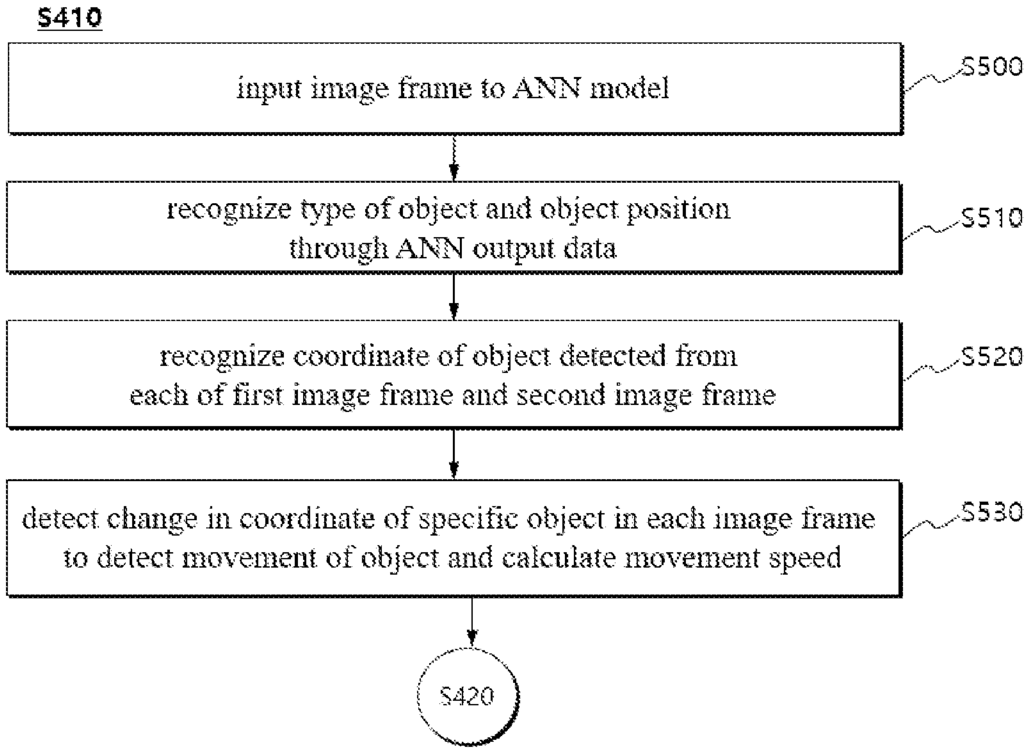
FIG. 5 is a diagram illustrating an example of an object recognition method according to an embodiment of the present disclosure.
Figure 6:
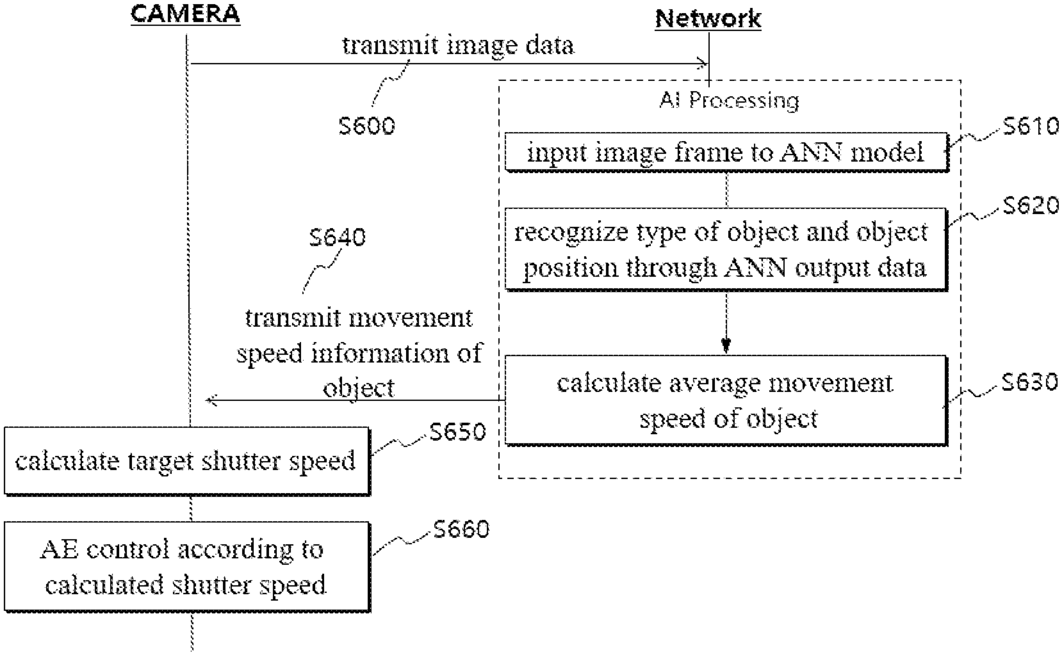
FIG. 6 is a diagram illustrating another example of an object recognition method according to an embodiment of the present disclosure.
Figure 7:
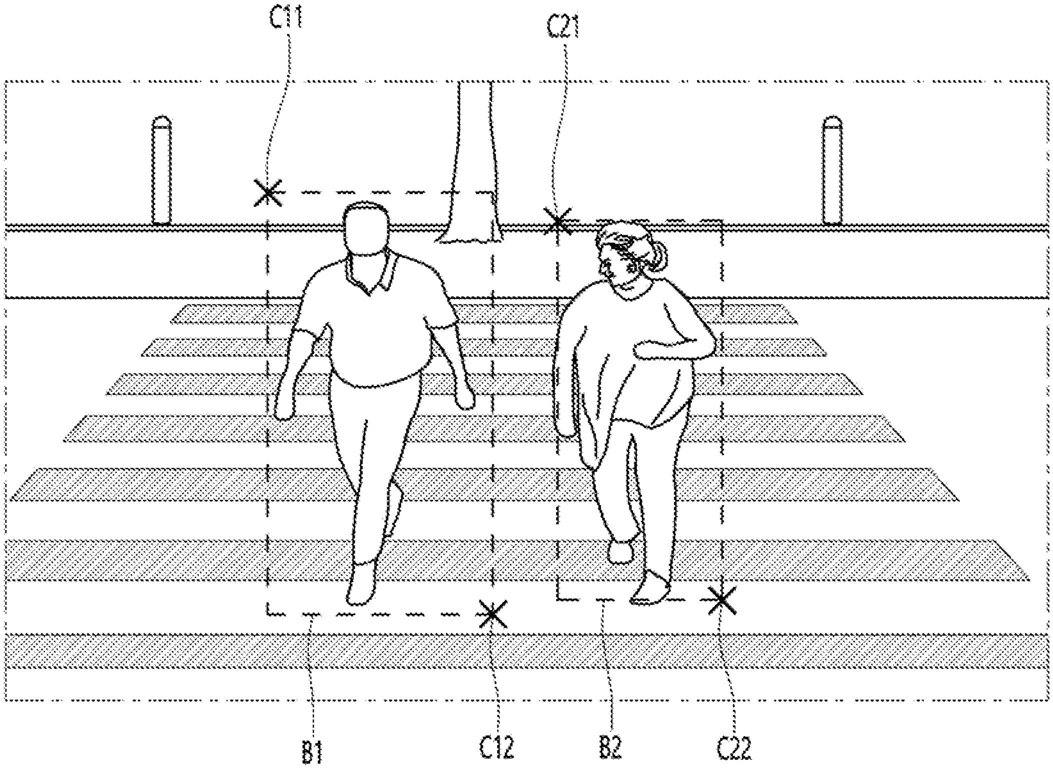
FIG. 7 is a diagram illustrating an object recognition process using an artificial intelligence algorithm according to an embodiment of the present disclosure.
Figure 8A:
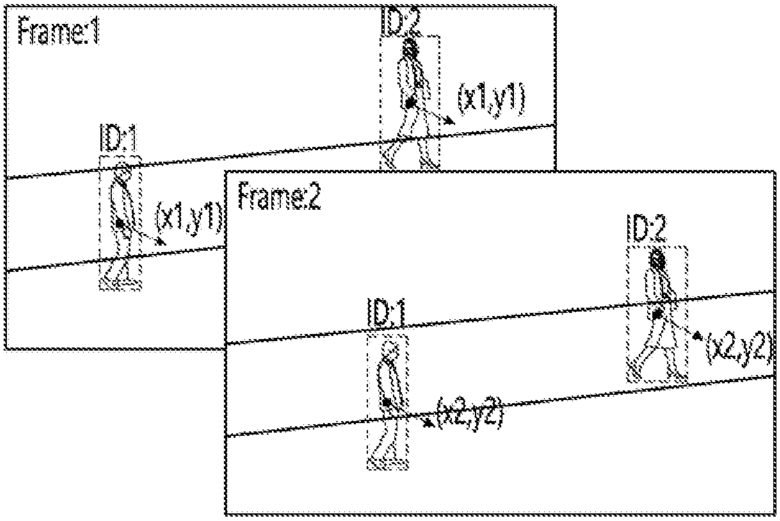
FIGS. 8A and 8B illustrate a process of calculating an average movement speed of a recognized object in FIG. 7.
Figure 8B:
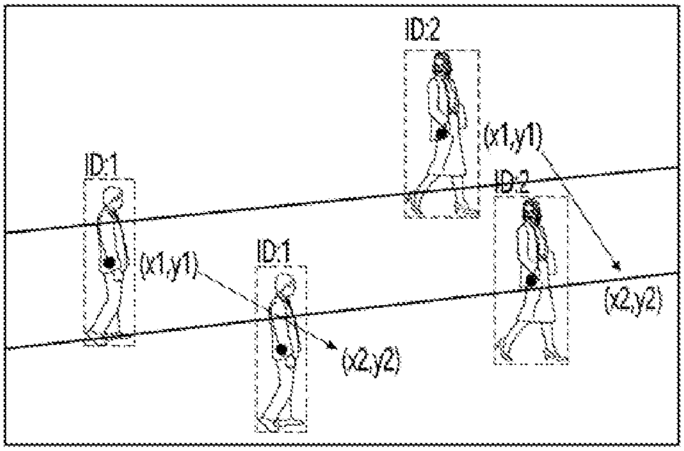

FIG. 5 is a diagram illustrating an example of an object recognition method according to an embodiment of the present disclosure. FIG. 6 is a diagram illustrating another example of an object recognition method according to an embodiment of the present disclosure. FIG. 7 is a diagram illustrating an object recognition process using an artificial intelligence algorithm according to an embodiment of the present disclosure. FIGS. 8A and 8B illustrate a process of calculating an average movement speed of a recognized object in FIG. 7. Hereinafter, the process of recognizing objects and calculating an average movement speed of objects using an AI algorithm will be described with reference to FIGS. 5 to 8.

Referring to FIG. 5, which may correspond to the operation S410 shown in FIG. 4, the processor 260 of the surveillance camera inputs an image frame into an artificial neural network model (S500).

The neural network model may be a model trained to use camera images as input data and recognize objects (people, cars, etc.) included in the input image data. As described above, according to an embodiment of the present disclosure, the YOLO algorithm may be applied to the neural network model.

The processor 260 may recognize a type of object and a location of the object through output data of the neural network model (S510). Referring to FIG. 7, an output result of the neural network model and an object recognition result of the neural network model may be displayed in bounding boxes (B1 and B2) and may include coordinate values of the corners C11 and C12/C21 and C22) of each bounding box. The processor 260 may calculate center coordinates of each bounding box through the edge information about the bounding box.

The processor 260 may recognize the coordinates of objects detected in each of first and second image frames (S520). The processor 260 may analyze the first image frame and the second image frame obtained after the first image frame to calculate a movement speed of the object.

The processor 260 may detect a change in the coordinates of a specific object in each image frame, detect movement of the object, and calculate the movement speed (S530).

Meanwhile, FIG. 5 illustrates the process of recognizing an object through AI processing results in a surveillance camera, but FIG. 6 illustrates a case in which the AI processing operation is performed through a network, that is, an external server.

Referring to FIG. 6, when a surveillance camera acquires an image, the surveillance camera transmits the acquired image data to a network (external server, etc.) (S600). Here, along with transmission of the image data, the surveillance camera may also request information on the presence or absence of an object included in the image and an average movement speed of an object if the object exists.

The external server may check the image frame to be input to the neural network model from the image data received from the surveillance camera through the AI processor, and the AI processor may control the image frame to be applied to the neural network model, which may be an ANN model (S610). In addition, the AI processor included in the external server may recognize the type and location of the object through the output data of the neural network model (S620).

The external server may calculate an average movement speed for the recognized object through the output value of the neural network model (S630). Object recognition and calculation of the average movement speed of the object are as described above.

The surveillance camera may receive object recognition results and/or average movement speed information about the object from an external server (S640).

The surveillance camera applies to a target shutter speed calculation function based on the average movement speed information about the object and calculates the target shutter value (S650).

The surveillance camera may perform automatic exposure control according to the calculated shutter speed (S660).

Referring to FIG. 8A, when recognizing an object through a neural network model, the processor 260 may display a bounding box on the border of the recognized object and assign an ID to each object. Accordingly, the processor 260 may check an object recognition result through the ID of each recognized object and the center coordinates of the bounding box. The object recognition result may be provided for each of the first and second image frames. Here, in the case of a second image frame, if a new object, rather than the object recognized in the first image frame, which is the previous image, is recognized, a new ID is assigned and the center coordinates of the object may be obtained through the bounding box coordinates.

Referring to FIG. 8B, when the center coordinates of an object obtained from at least two image frames are obtained, the processor 260 may calculate a movement speed of the recognized object based on a change in the center coordinates.

[Equation 1]

$$\text{object speed}_{(ID=1)} = \frac{\sqrt{(X_2 - X_1)^2 + (Y_2 - Y_1)^2}}{\Delta T(\text{시간})}$$

$$\text{object speed}_{(ID=2)} = \frac{\sqrt{(X_2 - X_1)^2 + (Y_2 - Y_1)^2}}{\Delta T(\text{시간})}$$

Here, $(X_1, Y_1)$ are the center coordinates of the first object ID1, and $(X_2, V_2)$ are the center coordinates of the second object ID2.

In addition, the processor 260 may calculate an average movement speed of the object by applying an average filter to the calculated movement speed of each object (refer to formula below).

[Equation 2]

$$\text{average object speed} = \frac{\sum_{k=0}^{n} \text{Object speed}_{ID=k}}{\text{total number of objects}}$$

The processor 260 recognizes objects and calculates the average movement speed of the recognized objects through the aforementioned process for every image frame input from the surveillance camera. The calculated average object speed may be used to calculate a target shutter speed to be described in FIG. 9.

Meanwhile, the processor 260 checks each sequential image frame, such as a current frame, a previous frame, and a next frame, and deletes the assigned object ID when the recognized object ID disappears from the screen. Accordingly, the total number of objects may also be reduced. Conversely, when an object that did not exist in the previous image frame is newly recognized, the processor 260 assigns a new object ID, includes the object in the average movement speed of the object, and increases the total number of objects. If the object ID included in the image frame is 0, the processor 260 determines that there is no object in the acquired image.

Figure 9:
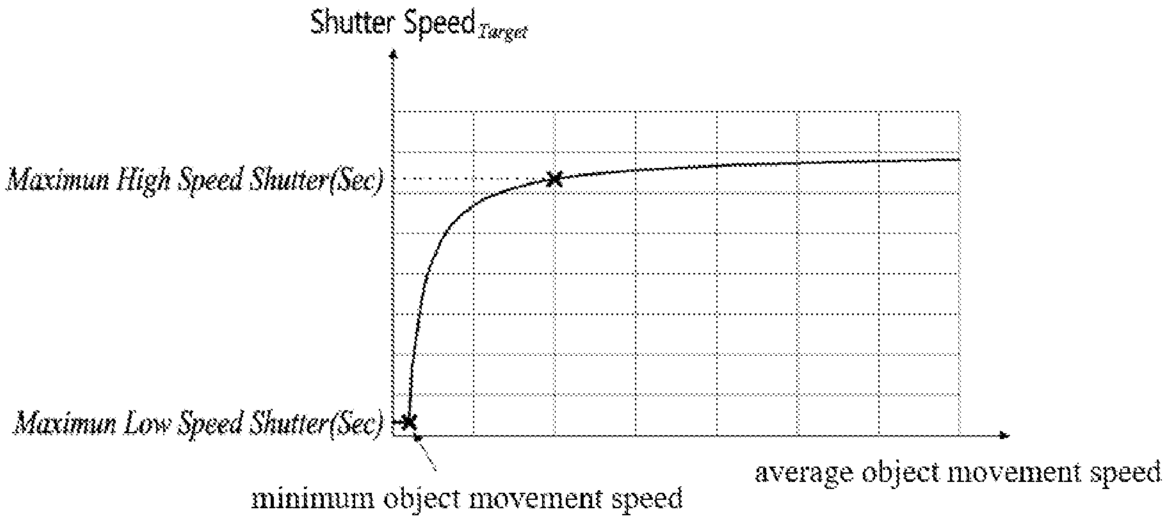
FIG. 9 is a diagram illustrating a relationship between an average movement speed of an object to be applied to automatic exposure and a shutter speed according to an embodiment of the present disclosure.

FIG. 9 is a diagram illustrating a relationship between the average movement speed of an object and the shutter speed to be applied to automatic exposure according to an embodiment of the present disclosure.

Referring to FIG. 9, a graph related to the shutter speed calculation function is disclosed.

Here, the shutter speed corresponding to the average movement speed of the object may refer to the target shutter speed to be actually applied to automatic exposure (AE). As the average movement speed of the object increases, motion blur increases. In addition, motion blur generally occurs as much as a distance an object moves during one frame when using a minimum shutter speed. Therefore, in order to check the degree of motion blur, it is necessary to check the "average amount of object movement per frame", which may be checked using the formula (Equation 3) below.

Average Amount of Objet Movement/1 Frame=Object Movement Speed×1 Frame Output Time (unit: pixel) (3)

However, in the minimum shutter speed, a frame refers to 1 frame when 30 videos are output.

A target shutter value may be calculated by reducing an exposure time of the low-speed shutter as shown in Equation 4 below based on the "average amount of object movement per frame" in Equation 3 above. It may be seen that the greater the average movement speed of the object, the shorter the shutter exposure time becomes, and ultimately, the high-speed shutter becomes the target shutter value.

[Equation 4]

$$\text{Shutter Speed}_{Target} = \frac{\text{Minimum\_Shutter\_Speed}}{\text{amount of object movement for 1 frame time}} \times \text{Visual\_Sensitivity}$$

Here, the minimum shutter speed is a minimum shutter speed (ex 1/30 sec), and visual sensitivity refers to visual sensitivity according to the resolution of the image.

Meanwhile, the target shutter speed calculation process according to Equation 4 above may be applied to a case in which an object is recognized and a case in which a movement speed of the recognized object is above a certain speed.

However, if an object is not recognized or an average movement speed of the recognized object is less than a certain speed, the object movement amount may be lowered, so the minimum shutter speed value may be applied to the shutter.

Meanwhile, a minimum shutter value (or a minimum shutter speed) may vary depending on the performance of the surveillance camera, and according to an embodiment of the present disclosure, a factor reflecting the performance of the surveillance camera is considered in the shutter speed calculation function. In other words, in the case of a high-pixel camera, the visual sensitivity of motion blur may be lower than a low-pixel camera, so a unique visual sensitivity value of a camera is applied. In reality, the amount of movement of an object in the same angle of view is calculated to be greater for one frame time in a high-pixel camera image than in a low-pixel camera image. This is because high-pixel cameras express images with more pixels than low-pixel cameras even if the angle of view is the same. When the amount of object movement is large, a target shutter is calculated to be larger than that of a low-pixel camera, so it is necessary to apply a visual sensitivity value.

In the above, the process of calculating the shutter speed value according to a movement speed (an average movement speed) of the recognized object. The calculated shutter speed may be applied to automatic exposure control, and below, automatic exposure control according to the presence or absence of an object and/or a movement speed of the object will be described in detail by reflecting the surveillance camera characteristics.

Figure 10:
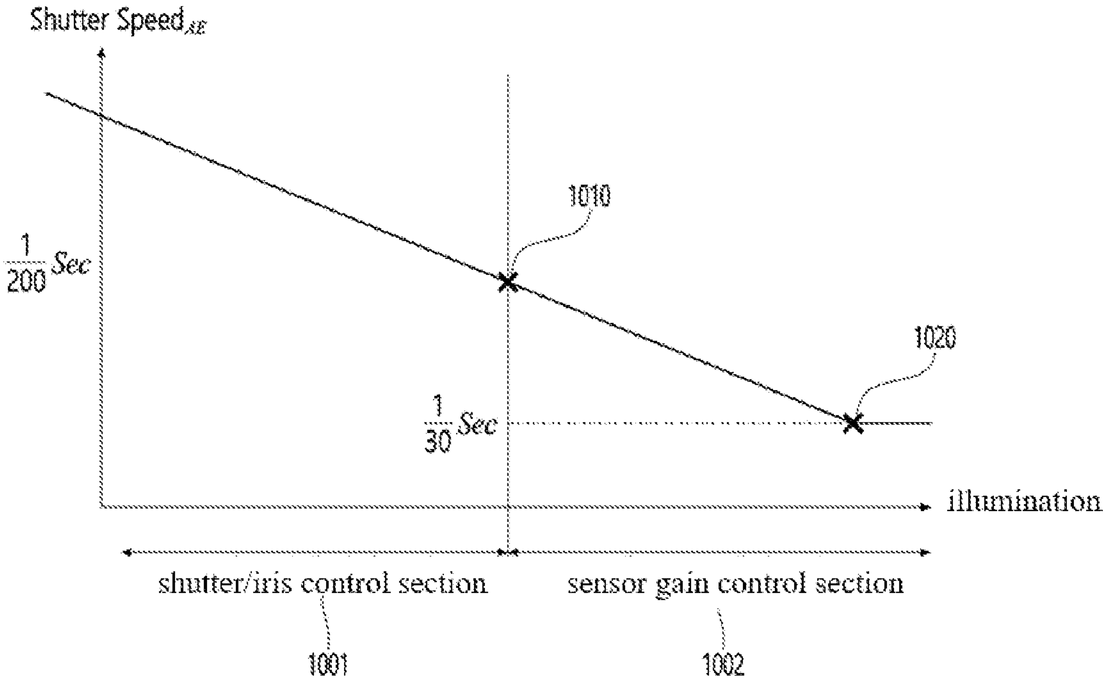
FIG. 10 is a diagram illustrating an automatic exposure control schedule that only considers object afterimage (motion blur) regardless of whether an object exists.
Figure 11:
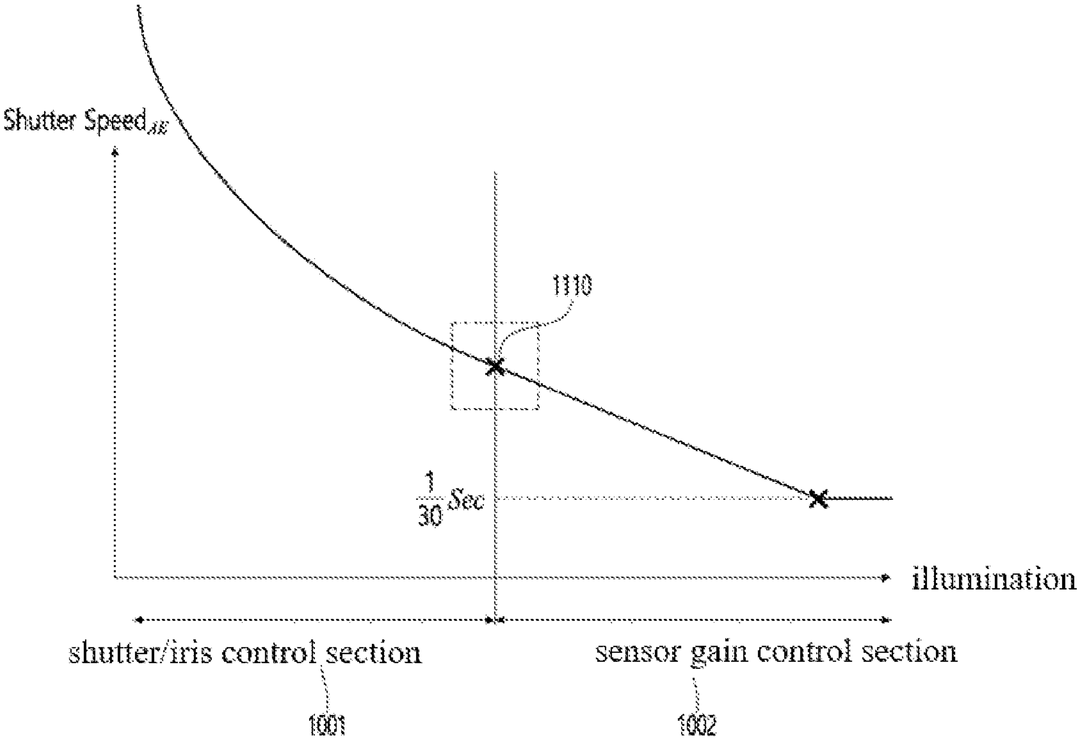
FIG. 11 is a diagram illustrating a process of applying a shutter speed according to a movement speed of an object to automatic exposure control according to an embodiment of the present disclosure.

FIG. 10 is a diagram illustrating an automatic exposure control schedule that only considers object afterimage (motion blur) regardless of whether an object exists. FIG. 11 is a diagram illustrating a process of applying a shutter speed according to a movement speed of an object to automatic exposure control according to an embodiment of the present disclosure.

Referring to FIG. 10, automatic exposure control may generally be performed through a shutter and iris control method and a sensor gain control method depending on brightness illumination. In bright illumination conditions, control is performed using the shutter and iris (1001 shutter/iris control section, hereinafter referred to as a first section), and in this case, a high-speed shutter is usually used, so motion blur (afterimage) problems may rarely occur. However, in the case of a section in which the illumination is relatively low (1002 sensor gain control section, hereinafter referred to as a second section), control is performed using a sensor gain, and the second section is a section in which noise occurs according to the sensor gain. Therefore, when only noise is considered, maintaining a shutter speed as low as possible (for example, 1/30 sec) in the sensor gain section may be advantageous in terms of image quality through brightness improvement and noise suppression. However, in the case of surveillance cameras, object recognition may be performed only when motion blur of objects is minimized even in low-illumination conditions, so there is no choice but to maintain high-speed shutter as much as possible.

FIG. 10 shows an AE control schedule in use in a conventional camera. In a case in which a high-speed shutter 1010 (1/200 sec), rather than a low-speed shutter 1020 (1/30 sec), is used in consideration of motion blur in the second section 1002, and at the same time, when the amount of gain amplification of the image sensor increases, the speed is gradually reduced to a low-speed shutter (1/30 sec) but it is general to maintain the high-speed shutter section as much as possible. However, since this AE control schedule uses a high-speed shutter (1/200 sec) from the beginning of the second section, there is a problem in that sensor gain amplification is added and more noise occurs on the image. This is because the minimum shutter speed is limited to a high-speed shutter (1/200 sec) from the starting point of the second section 1002 when only motion blur is the top consideration regardless of whether an object exists.

Meanwhile, referring to FIG. 11, the processor 260 of the surveillance camera variably applies a target shutter speed (refer to FIG. 9) calculated according to an average object movement speed to an initial start shutter value of a start section of the second section 1002 to simultaneously solve the problems of noise and motion blur in the second section 1002.

Referring to FIG. 11, when an object exists and there is a lot of movement, the processor 260 may vary the target shutter speed to a high shutter speed (for example, 1/300 second or more), and when there is no object or there is little movement, the processor 260 may vary the target shutter speed to a low shutter speed (1/30 second) and apply the varied shutter speed from the start of the second section control. The high-speed shutter value of 1/300 second and the low-speed shutter value of 1/30 second are example values, and the shutter value may be dynamically varied in the section of 1/300 second and 1/30 second depending on the movement speed of the object.

Accordingly, when an object exists or the average movement speed of the object is high, the object may be monitored without motion blur because the high-speed shutter is applied from the start of sensor gain control. In addition, when there is no object or the average movement speed of the object is low, the low-speed shutter is applied from the start of sensor gain control, having the advantage of being able to monitor image quality with low noise. That is, according to an embodiment of the present disclosure, the target shutter speed at the sensor gain control starting point is variably applied according to the presence or absence of the object and the degree of movement of the recognized object (a movement speed of the object) when the object exists, thereby performing monitoring with reduced noise and minimized motion blur.

Figure 12:
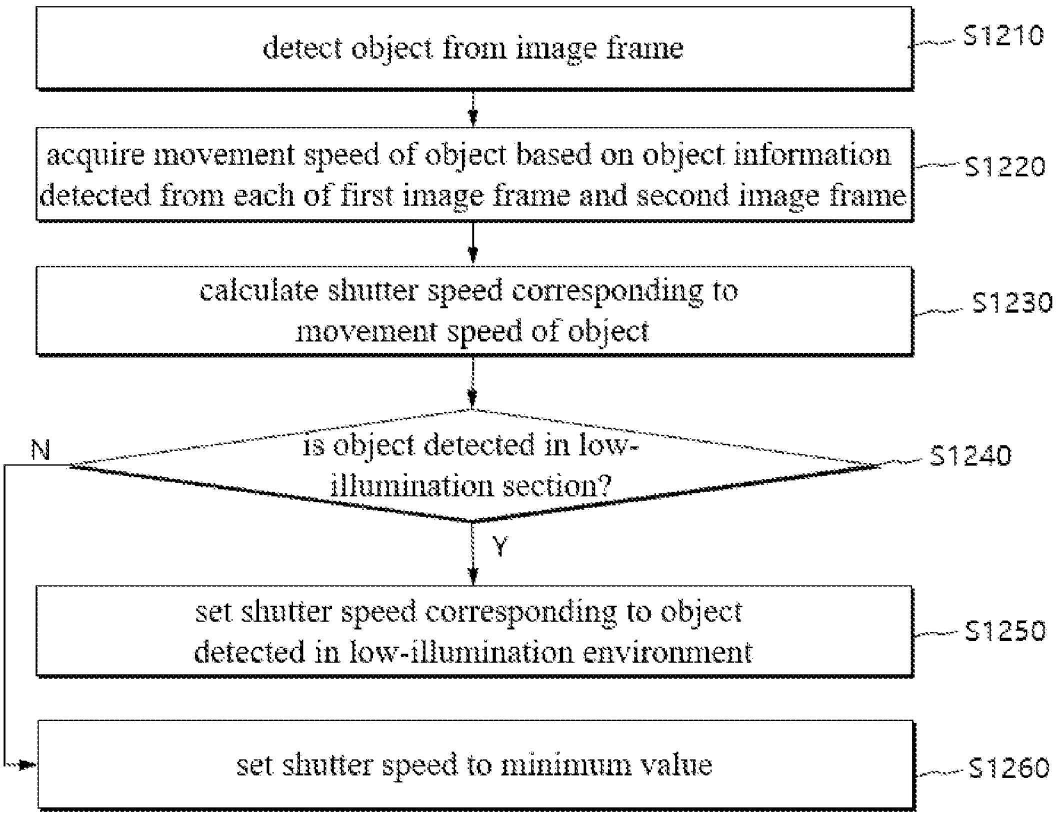
FIG. 12 is a flowchart of a method of controlling a shutter speed in a low-illumination section in a processing method of a surveillance camera image according to an embodiment of the present disclosure.

FIG. 12 is a flowchart of a method of controlling a shutter speed in a low-illumination section in a processing method of a surveillance camera image according to an embodiment of the present disclosure.

According to an embodiment, the processor 260 of the surveillance camera controls the shutter speed based on the presence or absence of an object and/or the degree of movement of the object, and may apply a different method of calculating the shutter speed according to an illumination environment in which the object is recognized.

Referring to FIG. 12, the processor 260 recognizes an object in an image frame through AI image analysis (S1210). The processor 260 acquires an average movement speed of the object based on object information recognized in each of the first and second image frames (S1220). In addition, the processor 260 may calculate a target shutter value corresponding to the average movement speed of the object (S1230). S1210 to S1230 may be applied in the same manner as described above with reference to FIGS. 5 to 9.

The processor 260 analyzes an illumination environment at the time the surveillance camera captures an image (or recognizes an object in the image), and when it is determined that the object has been recognized in the low-illumination section (S1240: Y), the processor 260 may set a shutter value at the starting point of the sensor gain control section as a first shutter value (S1250). Here, the first shutter value is a high-speed shutter value, and for example, the processor 260 may set a shutter value of 1/300 second or more to be applied. Even in this case, the processor 260 may set the shutter value at the starting point of the sensor gain control section variably according to the movement speed of the object by setting the shutter value to 1/200 second as a minimum shutter value.

In addition, if it is determined that the illumination environment is in a high intensity section when the surveillance camera captures the image (or recognizes an object in the image), the processor 260 may set the shutter value at the starting point of the sensor gain control section as a second shutter value. (S1260). Here, the second shutter value is a shutter value lower than the first shutter value, but since an object (or movement of an object) exists, the shutter value may be set to minimize motion blur (for example, 1/200 second)

Figure 13:
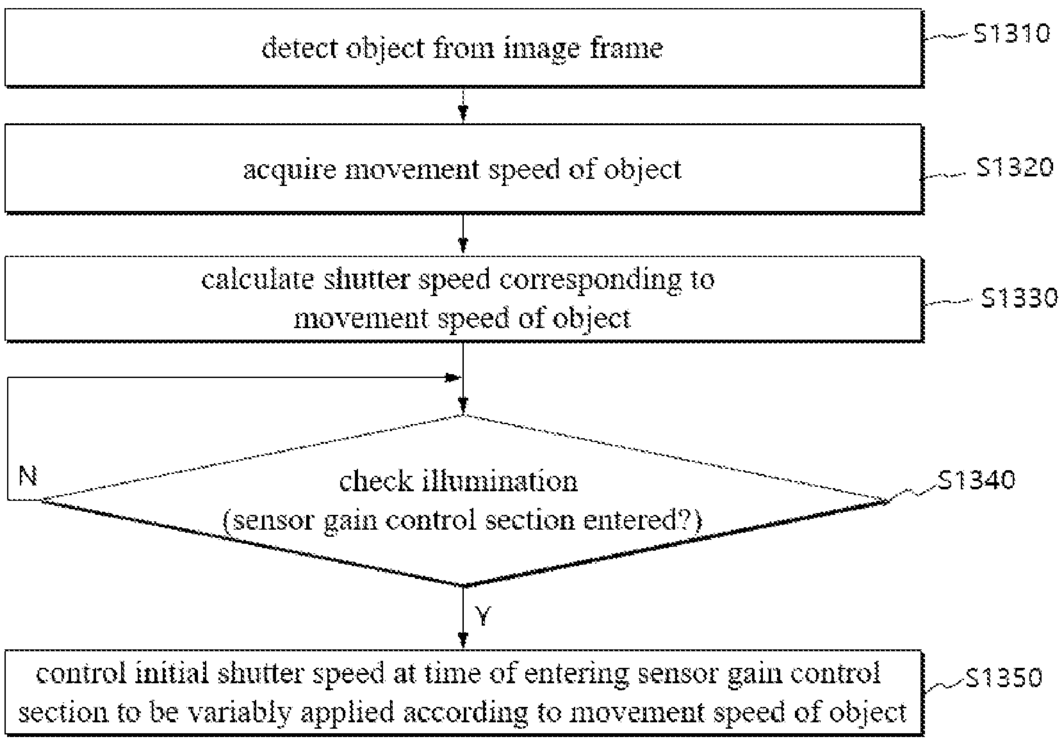
FIG. 13 is a flowchart of an automatic exposure control method in a processing method of a surveillance camera image according to an embodiment of the present disclosure.

FIG. 13 is a flowchart of an automatic exposure control method in a processing method of a surveillance camera image according to an embodiment of the present disclosure.

Referring to FIG. 13, the processor 260 recognizes an object in an image frame through AI image analysis (S1310). The processor 260 acquires an average movement speed of the object based on object information recognized in each of the first and second image frames (S1320). In addition, the processor 260 may calculate a target shutter value corresponding to an average movement speed of the object (S1330). S1310 to S1330 may be applied in the same manner as described above with reference to FIGS. 5 to 9.

Meanwhile, the processor 260 may determine whether the sensor gain control section is entered (S1340). The processing method of a surveillance camera image according to an embodiment of the present disclosure may vary the degree to which the shutter is maintained at a high speed according to the movement of objects in a low-illumination environment. Accordingly, when the processor 260 determines that the sensor gain control section is entered through checking the illumination, the processor 260 controls the initial shutter speed at the starting point of the sensor gain control section to be applied variably according to the movement speed of the object (S1350).

Meanwhile, the processor 260 may efficiently control noise and motion blur by using a low-speed shutter when the movement speed of the object is very slow (which is same as when an object does not exist).

Figure 14:
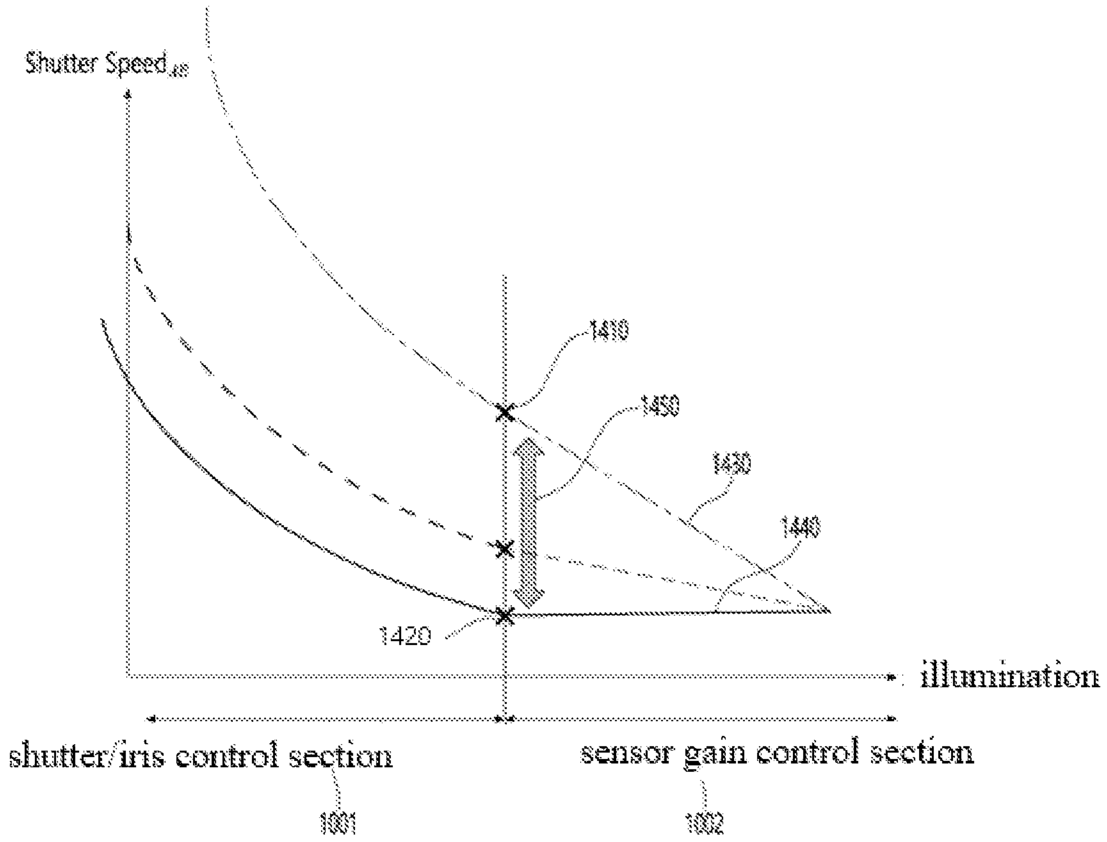
FIGS. 14 and 15 are diagrams illustrating an automatic exposure schedule that variably applies an initial shutter value of a sensor gain control section depending on the presence or absence of an object according to an embodiment of the present disclosure.
Figure 15:
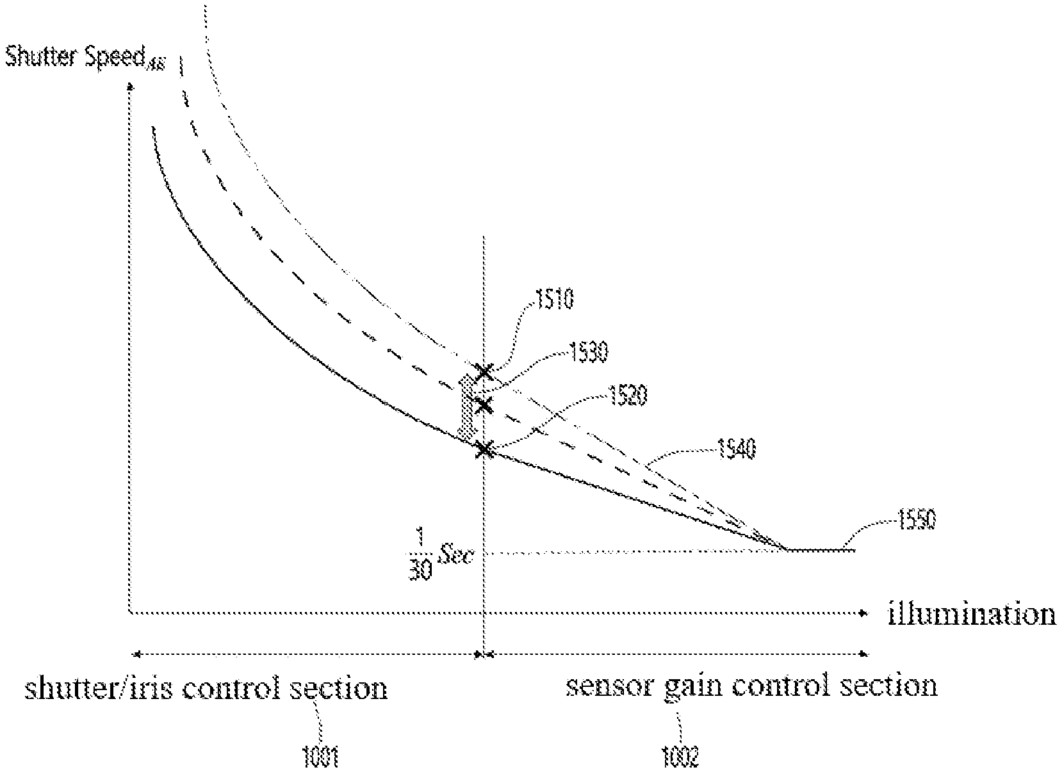

FIGS. 14 and 15 are diagrams illustrating an automatic exposure schedule that variably applies the initial shutter value of the sensor gain control section depending on the presence or absence of an object, according to an embodiment of the present disclosure.

FIG. 14 shows a first automatic exposure control curve 1430 when there is movement of the object and a second automatic exposure control curve 1440 when there is no object (a movement speed of the object is a certain value or less) as a result of recognizing an object through AI image analysis according to an embodiment of the present disclosure. Here, in the automatic exposure control graph, the horizontal axis is illumination, and the vertical axis is a shutter speed applied to automatic exposure control. The horizontal axis is divided into a shutter/iris control section 1001 and a sensor gain control section 1002 depending on the illumination. The processing method of a surveillance camera image according to an embodiment of the present disclosure may be applied to both the sensor gain control section 1002 and the shutter/iris control section 1001, but, in particular, may be usefully applied to determine a shutter speed at the starting point of the sensor gain control section 1002 to minimize noise and motion blur in the sensor gain control section 1002.

The shutter speed at the starting point of the sensor gain control section may be acquired through the first automatic exposure control curve 1430 and the second automatic exposure control curve 1440 described above. If there is no object in a surveillance camera image, the minimum shutter value (1420, for example, 1/30 sec) is applied to the shutter speed at the starting point of the sensor gain control section according to the second automatic exposure control curve 1440. If an object exists in the surveillance camera image, the maximum high-speed shutter value 1410 (for example, 1/300 second or more) may be applied as the shutter speed at the starting point of the sensor gain control section according to the first automatic exposure control curve 1430.

Meanwhile, the average movement speed of the object included in the surveillance camera image may vary, and the processor 260 may set a region between the first automatic exposure control curve 1430 and the second automatic exposure control curve 1440 as a variable range of the shutter speed of the starting point of the sensor gain control section according to the variable average movement speed of the object, and control the shutter speed to vary as the movement speed of the object varies.

Meanwhile, in FIG. 15, 1510 may be a shutter value obtained by applying object recognition and the average movement speed of the object to automatic exposure control through AI image analysis according to an embodiment of the present disclosure, and 1520 may be a shutter value obtained when an object is recognized through a general object recognition algorithm rather than AI image analysis. That is, according to an embodiment of the present disclosure, when the average movement speed of a recognized object varies in real time beyond the concept of object recognition, noise and motion blur may be minimized by precisely adjusting the shutter value at the starting point of the sensor gain control section.

In addition, if the shutter speed is high at the starting point of the sensor gain control section, a relatively high shutter speed may be maintained to extremely low-illumination conditions in a low-illumination environment. In addition, because a relatively high-speed shutter is used in the shutter/iris control section 1001, the motion blur phenomenon may be further improved. Meanwhile, 1540 is an automatic exposure control curve based on AI image analysis according to an embodiment of this disclosure, and 1550 is an automatic exposure control curve based on object recognition through a general object recognition algorithm rather than AI image analysis. And 1530 is the shutter variable range according to the average moving speed of the object.

Figure 16:
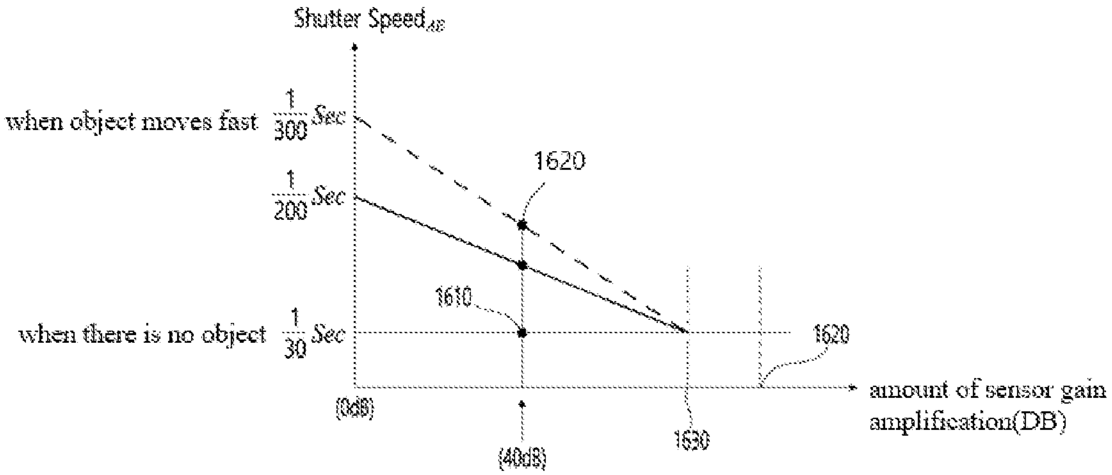
FIG. 16 is a diagram illustrating automatic exposure control depending on whether an object moves in a low-illumination section according to an embodiment of the present disclosure.
Figure 17:
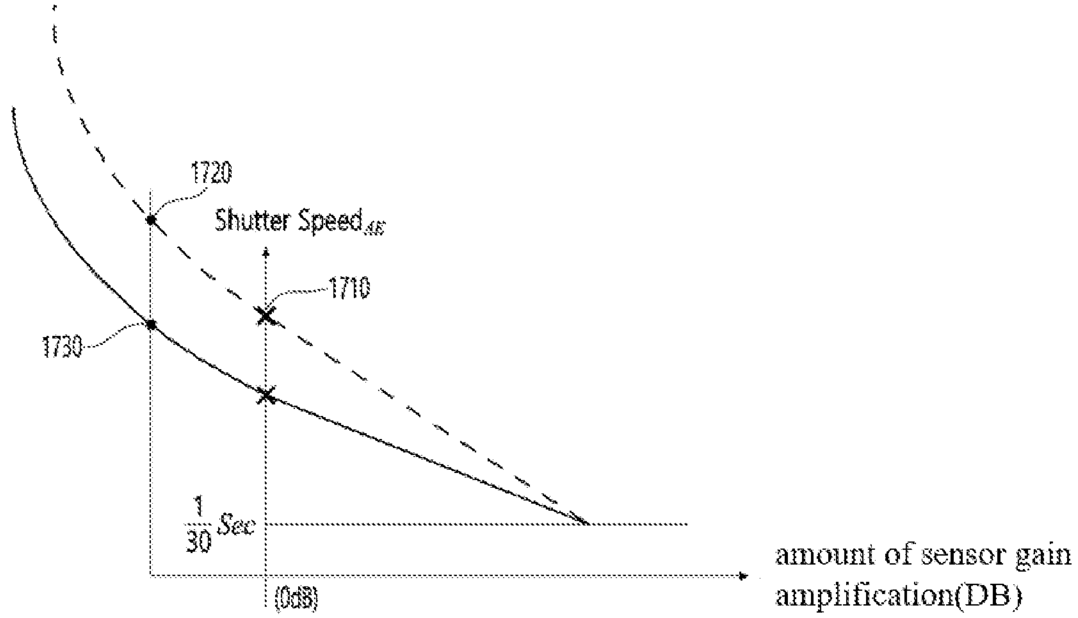
FIG. 17 is a diagram illustrating automatic exposure control depending on whether an object moves in a high-illumination section.

FIG. 16 is a diagram illustrating automatic exposure control depending on whether an object moves in a low-illumination section according to an embodiment of the present disclosure, and FIG. 17 is a diagram illustrating automatic exposure control depending on whether an object moves in a high-illumination section.

Referring to FIG. 16, when the shutter value at the starting point of the sensor gain control section is 1/300 second, the processor 260 controls the high-speed shutter (1620, 1/200 sec)), rather than the low-speed shutter value (1610, 1/30 second), to be maintained even when the sensor gain is amplified to 40 dB.

Referring to FIG. 17, 1710 is a shutter value (1/300 second) at the starting point of the sensor gain control section when the object moves quickly, 1720 is a shutter value when the object moves quickly in the bright illumination section, and 1730 is a shutter value when there is a little movement of the object in the bright illumination section. In other words, the processor 260 may apply different shutter values depending on the degree of movement of the object not only in the low-illumination section but also in the high-illumination section, and when there is movement of the object, the high-speed shutter is relatively applied, and thus, a clear image without motion blur may be obtained.

Figure 18:
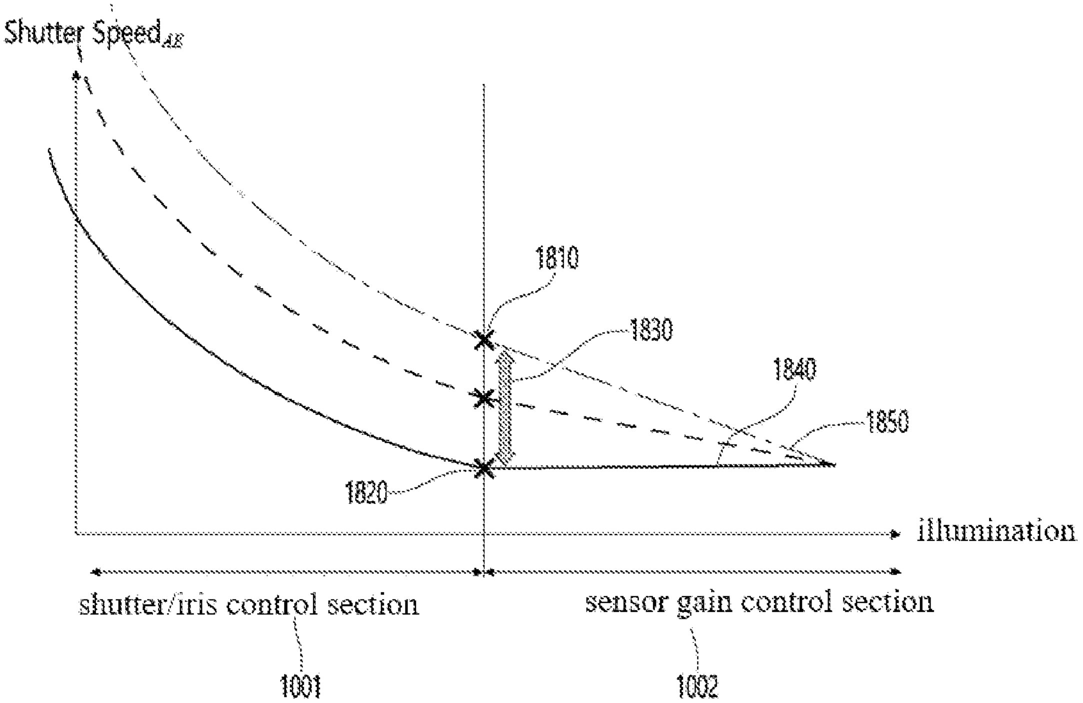
FIG. 18 is a diagram illustrating automatic exposure control when an object does not exist or a movement speed of the object is low according to an embodiment of the present disclosure.

FIG. 18 is a diagram illustrating automatic exposure control when an object does not exist or a movement speed of the object is low, according to an embodiment of the present disclosure.

Referring to FIG. 18, 1810 is a shutter value (1/200 sec) at the starting point of the sensor gain control section when the processing method of a surveillance camera image according to an embodiment of the present disclosure is not applied (1850 is the shutter control curve when the processing method of surveillance camera images according to an embodiment of the present specification is not applied). That is, in general, regardless of the presence or absence of an object and/or a movement speed of the object, the shutter value at the starting point of the sensor gain control section is set to a fixed value of a relatively high-speed shutter value (1/200 sec) considering the characteristics of the surveillance camera, but, according to an embodiment of the present disclosure, if an object does not exist through AI image analysis or if a speed thereof, if any, is very slow, the shutter value at the sensor gain starting point is maintained at a low speed shutter value (1820, 1/30 sec). Accordingly, the amount of gain amplification is relatively small, which has the advantage of causing less noise and also lowering a bandwidth when transmitting an image. 1840 is the minimum low-speed shutter maintenance curve when an object is not recognized through AI image analysis, according to an embodiment of the present specification. 1830 is the shutter variable range according to the average moving speed of the object.

Therefore, unlike the conventional automatic exposure control that applies the shutter value at the starting point of the sensor gain control section as a fixed value regardless of the existence of the object and/or the degree of movement of the object, according to an embodiment of the present disclosure, the shutter value at the starting point of the sensor gain control section is set to be higher than the fixed value when the movement speed of the object increases, and furthermore, if no object exists (including a case in which the movement of the object is very slow), the shutter value at the starting point of the center gain control section may be set to be lower than the fixed value.

Figure 19A:
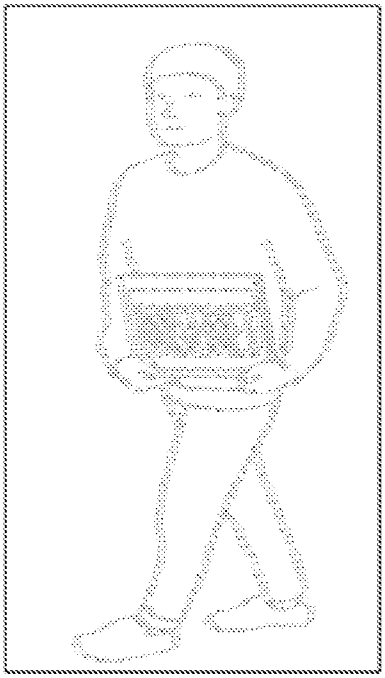
FIG. 19A illustrates an image obtained by applying a general shutter value.
Figure 19B:
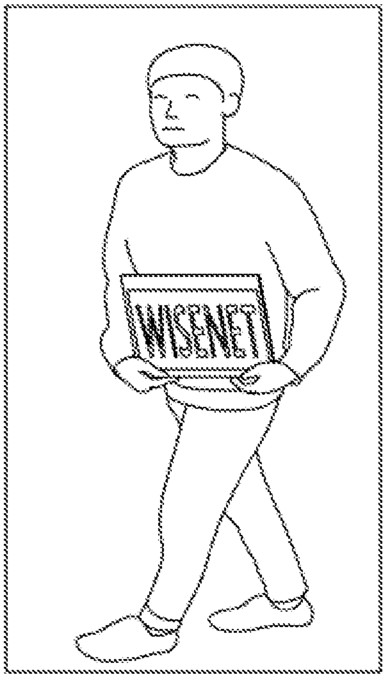
FIG. 19B illustrates an image obtained as a result of using AI automatic object recognition and a high-speed shutter, according to embodiments of the present disclosure.

FIGS. 19A and 19B illustrates a comparison between an image obtained by applying a general shutter value (FIG. 19A), and an image obtained as a result of using AI automatic object recognition and a high-speed shutter (FIG. 19B), according to embodiments of the present disclosure. The image shown in FIG. 19B has relatively less motion blur than the image shown in FIG. 19A, and may be a clearer image due to minimized noise.

In the above, the automatic exposure control process that minimizes noise and motion blur effects by variably controlling the shutter speed according to the presence or absence of an object and the movement speed of the object through artificial intelligence-based object recognition has been described. Although the application of an AI-based object recognition algorithm is described in the present disclosure, artificial intelligence may also be applied in the process of calculating a target shutter value according to an average movement speed of the recognized object. According to an embodiment, a target shutter value calculation function according to the average movement speed of the object described above has the performance information about the camera (visual sensitivity according to resolution of an image) and the amount of movement of the object during one frame time (a movement speed of the object) as variables. Accordingly, the surveillance camera applied to an embodiment of the present disclosure may generate a learning model by training the learning model by setting camera performance information and speed information about objects that may be recognized without motion blur as learning data. When the movement speed value of an object is input as input data, the learning model may automatically calculate a target shutter value according to the movement speed, and the target shutter value is a shutter value that may minimize noise and motion blur depending on illumination conditions.

In addition, according to an embodiment, the processor of the surveillance camera controls the real-time shutter value by changing the automatic exposure control function (an automatic exposure control curve) applied to the shutter value setting in real time as the average movement speed of the object described above changes in real time.

At least one of the components, elements, modules, units, or the like (collectively "components" in this paragraph) represented by a block or an equivalent indication (collectively "block") in the above embodiments, for example, device, processor, logic, controller, circuit, generator, detector, encoder, decoder, operator, latch, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). These components may, for example, be embodied in one or more semiconductor chips, or on substrate supports such as printed circuit boards and the like. These circuits may also be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The above embodiments may be applied to service provision fields using surveillance video cameras, surveillance video camera systems, and surveillance video cameras, etc.

What is claimed is:

1. A processing apparatus for a camera image, the processing apparatus comprising:

an image capture device configured to obtain an image; and a processor configured to recognize an object in the image, calculate a target shutter value corresponding to a movement speed of the object, and determine, when it is determined that a sensor gain control section is entered according to illumination in an automatic exposure control process including a shutter/iris control section and the sensor gain control section, an initial shutter value to be applied from a starting point of the sensor gain control section based on the calculated target shutter value, wherein the initial shutter value to be applied from the starting point of the sensor gain control section is determined to vary within a range between a first shutter value and a second shutter value smaller than the first shutter value depending on the movement speed of the object.

2. The processing apparatus of claim 1, wherein the processor is configured to recognize the object by applying a deep learning-based You Only Look Once (YOLO) algorithm.

3. The processing apparatus of claim 2, wherein the processor is configured to assign an identifier to the object, to extract coordinates of the object, and to calculate an average movement speed of the object based on coordinate information about the object included in a first image frame and a second image frame with a priority lower than the first image frame.

4. The processing apparatus of claim 3, wherein the processor is configured to calculate the target shutter value based on an amount of movement of the object in a unit frame time with respect to a minimum shutter speed of the image capture device and resolution of the camera image.

5. The processing apparatus of claim 4, wherein the processor is configured to train a learning model by setting performance information corresponding to the resolution of the camera image and speed information about an object recognizable without motion blur as learning data, and to calculate the target shutter value based on the learning model that uses the movement speed of the object as input data and automatically calculates the target shutter value according to the movement speed of the object.

6. The processing apparatus of claim 1, wherein the processor is configured to determine the initial shutter value to be applied from the starting point of the sensor gain control section to converge on the first shutter value as the movement speed of the object is faster, and to determine the initial shutter value at the starting point of the sensor gain control section to converge on the second shutter value as the movement speed of the object is slower.

7. The processing apparatus of claim 1, wherein the first shutter value is $\frac{1}{300}$ second or more, and the second shutter value is $\frac{1}{30}$ second.

8. The processing apparatus of claim 1, wherein, in the automatic exposure control process, the processor is configured to control a shutter speed of the image capture device in a low-illumination section corresponding to the sensor gain control section and a high-illumination section using an iris and a shutter, control the target shutter value according to an automatic exposure control schedule that is inversely proportional as a sensor gain amplification amount increases after passing through the initial shutter value applied from the starting point of the sensor gain control section, and wherein the processor is configured to set the automatic exposure control schedule such that the initial shutter value to be applied from the starting point of the sensor gain control section increases based on the movement speed of the object increasing.

9. The processing apparatus of claim 1, further comprising a communication unit, wherein the processor is configured to transmit data of the image to an external server through the communication unit, and receive artificial intelligence-based object recognition results from the external server through the communication unit.

10. A processing method of a camera image, the processing method comprising:

recognizing an object in an image obtained through an image capture device;

calculating a target shutter value corresponding to a movement speed of the object; and determining, when it is determined that a sensor gain control section is entered according to illumination in an automatic exposure control process including a shutter/iris control section and the sensor gain control section, an initial shutter value to be applied from a starting point of a sensor gain control section in an automatic exposure control process based on the calculated target shutter value, wherein the initial shutter value to be applied from the starting point of the sensor gain control section is determined to vary between a first shutter value and a second shutter value smaller than the first shutter value depending on the movement speed of the object.

11. The processing method of claim 10, wherein, in the recognizing of the object, the object is recognized by applying a deep learning-based You Only Look Once (YOLO) algorithm.

12. The processing method of claim 11, further comprising:

assigning an identifier to the object, and extracting information about coordinates of the object; and calculating an average movement speed of the object based on the information about the coordinates of the object included in a first image frame and a second image frame with a priority lower than the first image frame.

13. The processing method of claim 12, wherein the target shutter value is calculated based on an amount of movement of the object in a unit frame time with respect to a minimum shutter speed of the image capture device and resolution of the camera image.

14. The processing method of claim 13, wherein the calculating the target shutter value comprises:

training a learning model by setting performance information corresponding to the resolution of the camera image and speed information about an object recognizable without motion blur as learning data; and calculating the target shutter value based on the learning model that uses the movement speed of the object as input data, and automatically calculating the target shutter value according to the movement speed of the object.

15. The processing method of claim 10, wherein the initial shutter value to be applied from the starting point of the sensor gain control section is determined to converge on the first shutter value as the movement speed of the object is faster, and determined to converge on the second shutter value as the movement speed of the object is slower.

16. The processing method of claim 10, wherein the first shutter value is $\frac{1}{300}$ second or more, and the second shutter value is $\frac{1}{30}$ second.

* * * * *